US012111875B2

(12) United States Patent
Carbune et al.

(10) Patent No.: US 12,111,875 B2
(45) Date of Patent: Oct. 8, 2024

(54) PAIRING USER HEADPHONES WITH A LOCATION-BASED AUTOMATED ASSISTANT

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/081,372

(22) Filed: Dec. 14, 2022

(65) Prior Publication Data

US 2024/0202265 A1    Jun. 20, 2024

(51) Int. Cl.
*G06F 16/95*      (2019.01)
*G06F 16/9537*     (2019.01)

(52) U.S. Cl.
CPC .................... *G06F 16/9537* (2019.01)

(58) Field of Classification Search
CPC .................................................. G06F 16/9537
USPC .......................................................... 707/758
See application file for complete search history.

(56) References Cited

U.S. PATENT DOCUMENTS

| 11,275,553 | B2 | 3/2022 | Amarilio et al. | |
| 2013/0275164 | A1* | 10/2013 | Gruber | G10L 17/22 |
| | | | | 705/5 |
| 2015/0045068 | A1* | 2/2015 | Soffer | G01C 21/20 |
| | | | | 455/456.3 |
| 2016/0350812 | A1* | 12/2016 | Priness | G06Q 50/10 |
| 2017/0374176 | A1* | 12/2017 | Agrawal | G06Q 30/0269 |
| 2018/0293484 | A1* | 10/2018 | Wang | G06F 16/632 |
| 2018/0336904 | A1* | 11/2018 | Piercy | G10L 17/22 |
| 2019/0171845 | A1* | 6/2019 | Dotan-Cohen | H04L 51/02 |
| 2019/0187787 | A1* | 6/2019 | White | G06F 3/013 |
| 2020/0342874 | A1* | 10/2020 | Teserra | G06F 40/35 |
| 2021/0074295 | A1* | 3/2021 | Moreno | G10L 15/005 |
| 2021/0243294 | A1* | 8/2021 | Hassan | H04W 4/029 |

(Continued)

FOREIGN PATENT DOCUMENTS

| WO | 2017222844 A1 | 12/2017 | |
| WO | 2018213415 | 11/2018 | |
| WO | WO-2021050047 A1 * | 3/2021 | ......... G06F 16/9537 |

OTHER PUBLICATIONS

European Patent Office; International Search Report and Written Opinion issued in Application No. PCT/US2022/053148; 10 pages; dated Sep. 6, 2023.

*Primary Examiner* — Hicham Skhoun
(74) *Attorney, Agent, or Firm* — Gray Ice Higdon (57) ABSTRACT

Implementations described herein relate to pairing a location-based automated assistant with a user device. The user device can include, for example, a headphones apparatus and/or a device that is paired with the headphones apparatus. The user device provides an indication that it is present at a location that is associated with a location-based automated assistant. A trust measure is determined that is indicative of trust between the user device and the location-based automated assistant. User information is provided by the user device to the location-based automated assistant. The location-based automated assistant determines response data to provide, via one or more speakers associated with the user device, that is specific to the location and further based on the user information.

20 Claims, 6 Drawing Sheets

(56) References Cited

U.S. PATENT DOCUMENTS

| | | | |
|---|---|---|---|
| 2022/0083986 A1* | 3/2022 | Duffy | G06Q 10/1097 |
| 2022/0329691 A1* | 10/2022 | Chinthakunta | H04M 3/42042 |
| 2023/0245651 A1* | 8/2023 | Wang | G10L 13/027 |
| | | | 704/275 |
| 2023/0410421 A1* | 12/2023 | Stephens | G10L 15/08 |

* cited by examiner

PAIRING USER HEADPHONES WITH A LOCATION-BASED AUTOMATED ASSISTANT

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

SUMMARY

Implementations disclosed herein relate to providing a location-based automated assistant to a user, via headphones that are paired with a user device, when the user device is present at a particular location of the location-based automated assistant. The location-based automated assistant can be configured to generate information that is specific to the location and to provide the information to the user by causing rendering of the information at the headphones. In some implementations, the user device can provide user account-specific information to the location-based automated assistant, and the location-based automated assistant can generate the information further based on the account-specific information. Thus, while the user is present in the location, requests that are provided to the automated assistant and/or responses from the automated assistant can be tailored to the context of the user being present at the location. In various implementations, the location-based automated assistant can cause rendering of the information at the headphones independent of the user providing extensive, or any, touchscreen based inputs to request the information and/or to provide the account-specific information. Further, the location-based automated assistant can cause rendering of the information at the headphones without requiring any installation of the location-based automated assistant at the user device. In these and other manners, in addition to enhancing an experience of the user, a quantity of user inputs required to obtain the information is reduced (and even eliminated in some implementations), associated touchscreen on-time is likewise reduced, and no processor or storage resources of the user device are required in installing the location-based automated assistant.

As an example, a user can be wearing headphones that are paired to the user device of the user. When the user enters a location, such as a hotel lobby, the user can be prompted, via the user device and/or via a device that is present at the location (e.g., an information kiosk, a display interface in the lobby and/or hotel room) to pair with an automated assistant other than the automated assistant that is executing on the client device. For example, the hotel can provide, via one or more communication networks, an automated assistant that is capable of being provided to the user such that the user can interact with the hotel automated assistant, executing on a device other than the device of the user, in the same manner as the user can interact with the personal automated assistant executing on the user device. Once the automated assistant has been paired with the user device (e.g., via selecting an option via an interface at the location, via selecting an option via the user device), the user can provide requests to the hotel automated assistant and be provided with responses that are tailored for the hotel location.

For example, once paired with the hotel automated assistant, the user can utter a particular phrase to indicate that the query is related to the hotel, such as "OK Hotel Assistant, are there any dinner specials tonight?" In response, the location-based automated assistant can process the request and provide a response that is related to the hotel (e.g., dinner specials at the hotel restaurant rather than dinner specials at other restaurants). Also, for example, particular types of requests may be directed to the location-based automated assistant rather than to the automated assistant executing on the user device. For example, a request of "OK Assistant, where is there to eat near here" may be provided to the location-based automated assistant, which may provide information related to restaurants of the hotel rather than other restaurants in the area.

In some implementations, the user device can provide user account information to the location-based automated assistant. The type of user account information that is provided can be based on a trust measure between the location-based automated assistant and the user device. For example, the user can indicate, via one or more preferences, what information can be shared with location-based automated assistants. Information that may be shared can include information from emails and/or other messages, calendar entries, automated assistant preferences and/or settings (e.g., TTS configurations, ASR dictionaries, fulfillment preferences), and/or other information that can be utilized by the location-based automated assistant to tailor and/or personalize the interaction experience with the user.

As an example, a user can enter a hotel lobby and the user's user device can be paired with the hotel automated assistant, as described herein. Based on one or more security protocols (e.g., a security certificate, previous login information provided by the user, selection of the hotel as a trusted site), the user device can provide hotel reservation information (e.g. a booking code) to the location-based automated assistant. The location-based automated assistant can then provide information to the user regarding the reservation (e.g., "Your room is not yet ready. Would you like to wait in the lounge?") such that the user is not required to interact with, for example, a receptionist and/or a separate smartphone application of the hotel or a separate website of the hotel. Also, for example, the user can provide a request to the automated assistant and the automated assistant can utilize the reservation information to determine fulfillment data to provide to the user via the headphones of the user (e.g., in response to "OK Hotel Assistant, is my room ready?").

Once a user device has been paired with a location-based automated assistant, the automated assistant that is executing on the user device can be decoupled from the microphone(s) and/or speaker(s) of the user device and/or headphones. For example, once the location-based automated assistant is paired with the user device, any requests that are submitted by the user via an utterance can be provided to the location-based automated assistant for processing. In some implementations, some or all pre-processing (ASR, STT, NLU) can be performed by the automated assistant (or other component of the user device and/or headphones) that is executing on the user device. The device automated assistant can then provide pre-processed data to the location-based automated assistant, which can generate fulfillment data to either provide directly to the user via the headphone(s) or by providing the fulfillment data to the device automated assistant. Thus, in some implementations, the device automated assistant is not utilized while the user is interacting with the location-based automated assistant. In other implementations, the device automated assistant can facilitate communication between the user and the location-based automated assistant (while additionally, in some implementations, performing some processing of requests and/or responses).

In some implementations, the location-based automated assistant can determine whether the user has been previously present at the location and can provide responses based on the user being previously present at the location. For example, when a user first enters a hotel lobby, the automated assistant can provide responses that are related to first arriving at a hotel (e.g., information regarding where hotel facilities are located, information related to checking into the hotel), whereas when the user leaves the hotel and later returns (e.g., later in the same day), the user can instead be provided with responses that are related to current events at the hotel (e.g., convention information, current dining specials, cafe hours). Thus, in some implementations, responses of the location automated assistant can change based on a current time and/or how many times the user has been present at the location.

Thus, implementations described herein mitigate the need for a user to submit multiple requests to an automated assistant by tailoring responses to requests of the user to the location of the user. Computing resources are minimized by preemptively providing the user with information that is most relevant to the current location of the user while additionally minimizing network traffic that would otherwise be required for the user to submit multiple requests in order to obtain responses that are of interest to the user while present at a particular location. Further, by preemptively providing a location-based automated assistant with user account information, user preferences can be utilized to personalize the user experience without requiring additional computational resources that may be expended to otherwise provide user information to the automated assistant. For example, by providing ASR biasing dictionary information to the location-based automated assistant, the experience can be personalized to the user, thus minimizing the number of interactions with the location-based automated assistant that would otherwise be required if the ASR biasing dictionary information were not provided to the location automated assistant.

The above description is provided as an overview of some implementations of the present disclosure. Further description of those implementations, and other implementations, are described in more detail below.

DETAILED DESCRIPTION

Figure 1:
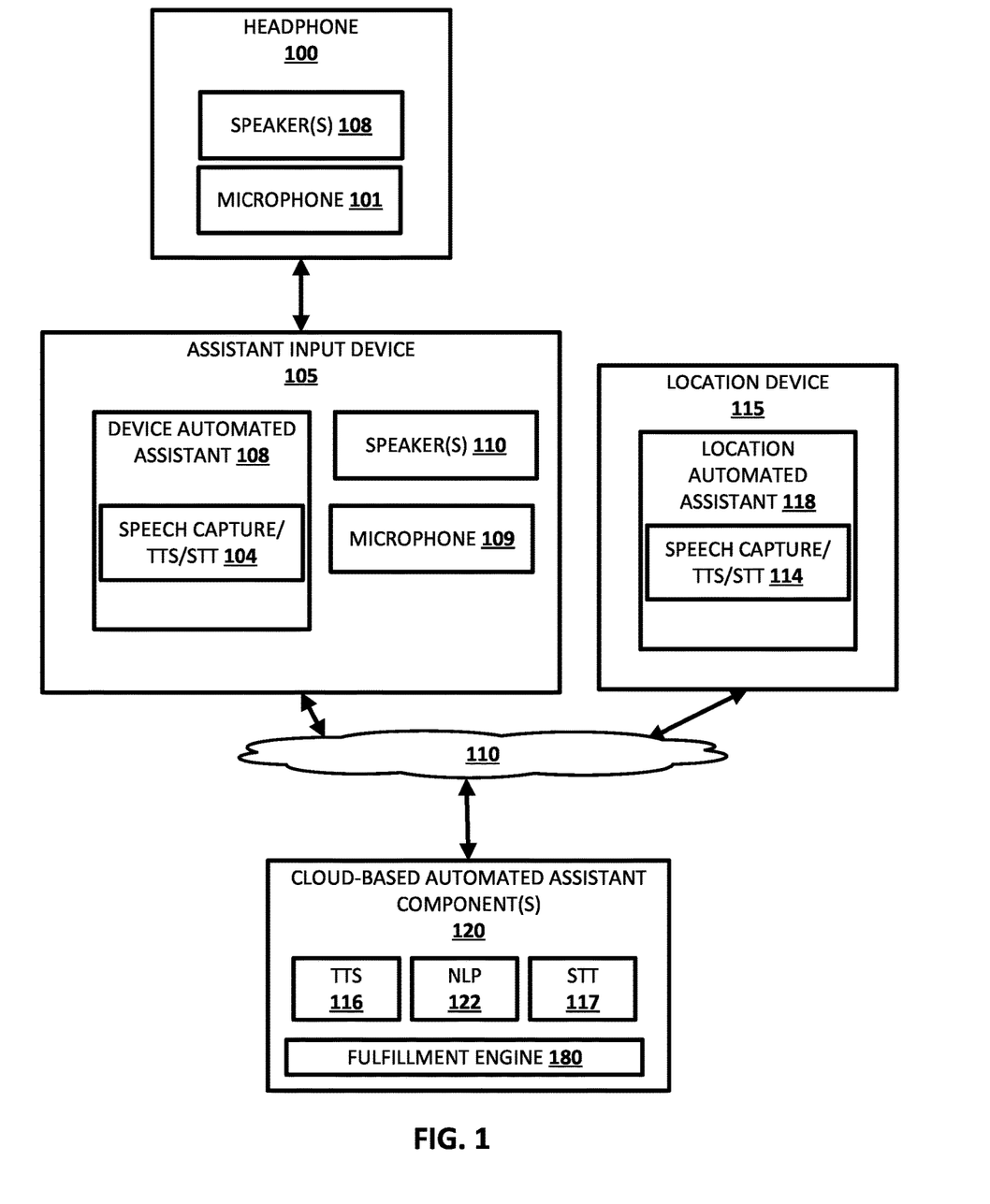
FIG. 1 is a block diagram of an example environment in which implementations disclosed herein may be implemented.

Turning now to FIG. 1, an example environment in which techniques disclosed herein may be implemented is illustrated. The example environment includes an assistant input device 105, a location device 115, and one or more cloud-based automated assistant components 120. Devices 105 and 115 can execute a respective instance of a respective automated assistant client 108 and 118. However, in some implementations one or more of the assistant input devices 105 and 115 can optionally lack an instance of the respective automated assistants 108 and 118, and still include engine(s) and hardware components for receiving and processing user input directed to an automated assistant (e.g., microphone(s) 101 and 109, speaker(s) 108, speech recognition engine(s), natural language processing engine(s), speech synthesis engine(s), and so on). An instance of the automated assistant client can be an application that is separate from an operating system of the respective devices 105 and 115 (e.g., installed "on top" of the operating system)—or can alternatively be implemented directly by the operating system of the respective devices 105 and 115. As described further below, each instance of the automated assistant client 108 and 118 can optionally interact with one or more cloud-based automated assistant components 120 in responding to various requests provided by respective user interface components of any one of the respective devices 105 and 115. Further, and as also described below, other engine(s) of the devices 105 and 115 can optionally interact with one or more of the cloud-based automated assistant components 120.

One or more the cloud-based automated assistant components 120 can be implemented on one or more computing systems (e.g., server(s) collectively referred to as a "cloud" or a "remote" computing system) that are communicatively coupled to respective devices 105 and/or 115 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 120 with the devices 105 and/or 115 is indicated generally by 110 of FIG. 1. Also, in some implementations, the assistant input devices 106 may be communicatively coupled with each other via one or more networks (e.g., LANs and/or WANs).

An instance of an automated assistant client 108 and/or 118, by way of its interactions with one or more of the cloud-based automated assistant components 120, may form what appears to be, from a user's perspective, a logical instance of an automated assistant with which the user may engage in a human-to-computer dialog. For example, a first automated assistant can be encompassed by a device automated assistant client 108 of a first assistant input device 105 and one or more cloud-based automated assistant components 120. A second automated assistant can be encompassed by location automated assistant client 118 of a location device 115 and one or more cloud-based automated assistant components 120. It thus should be understood that each user that engages with an automated assistant client 108 and/or 118 executing on one or more of the input devices 105 and/or 115 may, in effect, engage with his or her own logical instance of an automated assistant (or a logical instance of automated assistant that is shared amongst a household or other group of users and/or shared amongst multiple automated assistant clients). Although only one assistant input device 105 is illustrated in FIG. 1, it is understood that cloud-based automated assistant component(s) 120 can additionally serve many additional assistant input devices. Moreover, although various engines of the cloud-based automated assistant components 120 are described herein as being implemented separate from the automated assistant clients (e.g., at server(s)), it should be understood that it is for the sake of example and is not meant to be limiting. For instance, one or more (e.g., all) of the engines described with respect to the cloud-based automated assistant components 120 can be implemented locally by one or more of the devices 105 and/or 115.

The devices 105 and/or 115 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device, a headphone apparatus), and/or any IoT device capable of receiving user input directed to the automated assistant. Additional and/or alternative assistant input devices may be provided. In some implementations, devices 105 and/or 115 can be associated with each other in various ways in order to facilitate performance of techniques described herein. For example, in some implementations, the devices 105 and 115 may be associated with each other by virtue of being communicatively coupled via one or more networks (e.g., via the network(s) 110 of FIG. 1). This may be the case, for instance, where the plurality of input devices are deployed across a particular area or environment, such as a home, a building, and so forth. Additionally, or alternatively, in some implementations, devices 105 and 115 may be associated with each other by virtue of them being members of a coordinated ecosystem that are at least selectively accessible by one or more users (e.g., an individual, a family, employees of an organization, other predefined groups, etc.). In some of those implementations, the ecosystem of the devices 105 and 115 can be manually and/or automatically associated with each other in a device topology representation of the ecosystem.

Additionally, or alternatively, in some implementations, one or more of the input devices 105 and/or 115 may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the devices 105 and/or 115 and/or any other computing device(s) operating one or more of the cloud-based automated assistant components 120 may include one or more memories for storage of data and software applications, one or more processors for accessing data and executing applications, and other components that facilitate communication over a network. The operations performed by one or more of the devices 105 and/or 115 and/or by the automated assistant may be distributed across multiple computer systems. The automated assistant may be implemented as, for example, computer programs running on one or more computers in one or more locations that are coupled to each other through a network (e.g., the network(s) 110 of FIG. 1).

As noted above, in various implementations, each of the devices 105 and/or 115 may operate a respective automated assistant client 108 and/or 118. In various embodiments, each automated assistant client may include a respective speech capture/text-to-speech (TTS)/speech-to-text (STT) module 104 and/or 114 (also referred to herein simply as "speech capture/TTS/STT module"). In other implementations, one or more aspects of the respective speech capture/TTS/STT module 104 and/or 114 may be implemented separately from the respective automated assistant client 108 and/or 118 (e.g., by one or more of the cloud-based automated assistant components 120).

Each respective speech capture/TTS/STT module 104 and/or 114 may be configured to perform one or more functions including, for example: capture a user's speech (speech capture, e.g., via respective microphone(s) 101 and/or 111); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally at each of the respective devices 105 and/or 115 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 104 and/or 114 that is local to each of the devices 105 and/or 115 may be configured to convert a finite number of different spoken phrases to text (or to other forms, such as lower dimensionality embeddings) using the speech recognition model(s). Other speech input may be sent to one or more of the cloud-based automated assistant components 120, which may include a cloud-based TTS module 116 and/or a cloud-based STT module 117.

Cloud-based STT module 117 may be configured to leverage the virtually limitless resources of the cloud to convert audio data captured by the speech capture/TTS/STT module 104 and/or 114 into text (which may then be provided to natural language processing (NLP) module 122) using speech recognition model(s). Cloud-based TTS module 116 may be configured to leverage the virtually limitless resources of the cloud to convert textual data (e.g., text formulated by automated assistant) into computer-generated speech output using speech synthesis model(s). In some implementations, the cloud-based TTS module 116 may provide the computer-generated speech output to one or more of the devices 105 and/or 115 to be output directly, e.g., using respective speaker(s) 108 of the respective assistant devices. In other implementations, textual data (e.g., a client device notification included in a command) generated by the automated assistant using the cloud-based TTS module 116 may be provided to speech capture/TTS/STT module 104 and/or 114 of the respective assistant devices, which may then locally convert the textual data into computer-generated speech using the speech synthesis model(s), and cause the computer-generated speech to be rendered via local speaker(s) 108 and/or 118 of the respective assistant devices.

The NLP module 122 processes natural language input generated by users via the assistant input devices and may generate annotated output for use by one or more other components of the automated assistant, the assistant input devices. For example, the NLP module 122 may process natural language free-form input that is generated by a user via one or more respective user interface input devices of the assistant input device 105. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

Assistant input device 105 is paired with headphone 100. In some implementations, the pairing can be a wired connection between the headphone and the device. In some implementations, the pairing can be a wireless pairing between the headphone and respective assistant input device, such as via a Wifi and/or Bluetooth connection. Headphones 100 includes one or more speakers 108 and optionally, can include one or more microphones 101. Thus, in some implementations, a user can provide a spoken utterance via one or more microphones that are a component of the device 105 (i.e., microphone 101) and/or a user can provide a spoken utterance via the microphone(s) that are components of the headphone(s) 100.

The headphones 100 can be any personal device that the user can place on or near one or more of the user's ears such that audio data that is provided via the speakers 108 can be heard by the user and not by others in the vicinity of the user. Also, for example, in some implementations, the headphones may utilize one or more other techniques for conveying audio data to the user without providing the audio data to others in the vicinity of the user, such as via sound conduction. Thus, the speakers 108 can instead be one or more components that generate waves via sound conduction and convey the waves to the user such that the user perceives the waves as audio that is rendered by one or more components of the assistant input devices 105.

In some implementations, the assistant input device 105 can be a headphones apparatus. For example, in some implementations, headphones 100 can be absent and any or all of the response data that is described as otherwise being provided by speaker(s) 108 can be provided by speaker(s) 110. Thus, in some implementations, the assistant input device can be both a device that is wearable by the user and through which the user can receive responses and provide requests as well as perform at least a portion of the processing of requests. Also, for example, the assistant input device 105 can connect directly with the location device (such as via BLUETOOTH and/or a Wifi connection) such that responses that are generated by the location device 115 can be rendered via the speaker(s) 110.

In some implementations, automated assistant client 108 can render audio via speaker 108 such that only the user that has placed headphone 100 on or near the user's ear can hear the rendered audio. Likewise, in some implementations, automated assistant client 108 can process audio data that is captured by microphone 101 and/or 109, determine a response to a request included in the audio data, and provide a response via the speakers 108. As an example, a user of headphone 100 can utter an invocation phrase of "OK Assistant," followed by a request of "What is the weather today." In response, automated assistant client 108 can process the request, and provide, via speaker(s) 108, a response of "the weather is 75 and sunny today."

A user can enter a location that allows the user device 105 to communicate with location device 115. For example, network 110 can be a Wifi network that is accessible within a location, such as a hotel, a gym, and/or a museum. The assistant input device 105 can connect to the network 110 and location automated assistant 118 can begin communication with the device automated assistant 108 and/or directly with the headphones 100. For example, the user can enter a hotel lobby and an interface may be present that can direct a user to connect the assistant input device 105 with the network 110. In some implementations, a user device can include an "auto-pairing" option which, when enabled, allows assistant input device 105 to automatically connect to some or all available networks. In some implementations, the user may be prompted, via an interface of assistant input device 105, to connect to network 110. For example, on entering a location, the user may be prompted "Would you like to connect to Hotel Network," and upon confirming to do so, be connected to network 110. In some implementations, a user may have previously been connected to network 110, left the location and been unpaired with the network 110, and may be automatically paired with the network 110 when the user returns to the location.

In some implementations, device automated assistant 108 and location automated assistant 118 may be instances of the same automated assistant. For example, device automated assistant 108 can be from Developer A and can be executing in part on assistant input device 105 and in part on cloud-based automated assistant components 120. Further, location automated assistant 118 can be an instance of the same automated assistant that is executing in part on location device 115 and in part on cloud-based automated assistant components 120. Thus, in some instances, the two automated assistants can share one or more components, thus user preferences for the automated assistant can be shared by the two instances. In some implementations, Once the assistant input device 105 is paired with the location device 115, some or all audio requests of the user that are captured via microphone 101 and/or microphone 109 may be provided to location automated assistant 118 in lieu of providing the request(s) to device automated assistant 108. For example, a user may utter the request "Where can I check in," which can be provided to location automated assistant 118 in lieu of providing the request to device automated assistant 108. Also, for example, the user may invoke device automated assistant 108 utilizing a different invocation phrase than the invocation phrase that can be utilized to invoke location automated assistant 118. For example, a user can utter "OK Assistant," followed by a request, for requests that are directed to device automated assistant 108. Further, for example, the user can utter "OK Hotel Assistant," followed by a request, for requests that are directed to location automated assistant 118.

In some implementations, as part of the pairing process, one or more components of the assistant input device 105 (and/or, when the device automated assistant 118 and the location automated assistant 118 are both instances of the same automated assistant and utilizing shared cloud based components, a component of cloud-based automated assistant components 119) can determine a trust measure between the assistant input device 105 and the location automated assistant 118. For example, when the location automated assistant 118 is paired with the assistant input device 105, the location automated assistant 118 can provide a security certificate that is verified, indicating that the location automated assistant 118 is a trusted automated assistant. In some implementations, a trust measure can vary depending on the entity that is executing the location automated assistant 118. For example, a hotel automated assistant (or an automated assistant of a particular hotel that the user has previously visited) may be more trusted than an automated assistant of a public transit vehicle (or of another hotel that the user is visiting for the first time). Thus, the trust measure of the public transit automated assistant may be lower than a trust measure of a hotel automated assistant. By having a lower trust measure, the public transit automated assistant may not be provided with the same information (e.g., less sensitive and/or no information) related to the user, whereas the hotel automated assistant may be provided with information that can be utilized by the hotel automated assistant when providing responses (e.g., reservation information, calendar entries).

In some implementations, device automated assistant 108 can provide one or more user preferences of the user to location automated assistant 118 that can be utilized to process requests of the user and/or generate responses of the user. For example, device automated assistant 108 can provide location automated assistant 118 with TTS configurations, STT configurations, ASR biasing dictionaries, fulfillment preferences, execution preferences, and/or other user preferences such that, in processing requests and/or generating responses, the requests and/or responses are tailored to the specific preferences of the user that is submitting the request and/or being provided the response. For example, a device automated assistant 108, during previous interactions with the user, may generate ASR dictionary terms that, when utilized to process requests, improve speech recognition for the user. For example, the ASR dictionary terms can be generated based on past ASR recognitions of spoken utterances of the user and/or based on past user corrections of incorrect past ASR recognitions. Accordingly, the ASR dictionary terms reflect terms that are likely to be spoken by the user. The ASR dictionary can be provided to location automated assistant 118 such that, when a request is received from the user, the user's ASR dictionary can be utilized to improve term recognition when performing ASR based on the audio data that includes the request. By doing so, the location automated assistant 118 can be more likely to correctly interpret the request and provide responses that are related to the location while still maintaining personalization when processing requests and/or generating responses for the user.

The location automated assistant 118 can provide responses to requests of the user that are tailored to the location. Further, the location automated assistant 118 can respond to requests that may be ambiguous if provided to the device automated assistant 108 and/or may not otherwise include contextual information that would be required by the device automated assistant 108 to respond. Thus, while the location automated assistant 118 is paired with the assistant input device 105 (and/or paired to the headphones 100), the user can be provided with responses that differ from the responses that would be provided by the device automated assistant 108.

As an example, the location can be a hotel (or hotel lobby) in which a location device 115 is executing a location automated assistant 118. Once paired to the assistant input device 105, the location automated assistant 118 can welcome the user to the hotel and invite the user to check in (e.g., give directions to the front desk, provide instructions for checking in). In instances where the trust measure between the assistant input device 105 and the location automated assistant 118 satisfies a threshold of trust, the assistant input device 105 can provide reservation information to the location automated assistant 118, thus facilitating checking in the user without requiring the user to interact with a receptionist at the check-in desk. Also, for example, the user may be prompted as to what information is available to share and can confirm providing the information before it is provided. Further, once paired with the location automated assistant 118, audio data that is captured by the microphone 101 and/or microphone 109 can be provided to the location automated assistant 118. Requests that are related to the hotel can be included in the audio data, which can be processed by the location automated assistant 118. This can include requests that are specific to the hotel that may not be properly processed by the device automated assistant 108. For example, the user can utter "book a table for dinner today at 7 pm," and the location automated assistant 118 can facilitate making a dinner reservation for the user without requiring the user to access a restaurant booking application and/or provide user information for the reservation. Also, for example, the user can indicate "I want room service for breakfast tomorrow" and the location automated assistant 118 can facilitate ordering room service for the user without the user providing a room number. In some implementations, if a user request results in a response that is unable to be fulfilled by the location (e.g., the restaurant is closed), the user can be provided with a response that is more general (e.g., restaurants in the area).

As another example, the location can be a gym that is executing the location automated assistant 118. The user can interact with a kiosk that is located at the entrance of the gym to pair assistant input device 105 with the location automated assistant 118 and/or the assistant input device 105 can automatically pair with the location automated assistant 118, particularly in instances where the user has been present at the location previously and granted permissions to do so. Following pairing, one or more components of the assistant input device (e.g., device automated assistant 108) can determine a trust measure between the location automated assistant 118 and the assistant input device 105. For example, a trust measure can be established that is less than the trust measure associated with pairing with a hotel and certain information (e.g., previous physical activity information from the past week, membership information) can be provided that is different than information that would be provided to a hotel. Once paired and information has been exchanged, the user can receive instructions regarding usage of gym equipment based on the user providing a request while in the vicinity of a particular machine. For example, the user may stand in the vicinity of a rowing machine and request "How do I use this?" and be provided with information related to the rowing machine. Also, for example, the user can provide a request of "How many repetitions should I do today?" and be provided with a personalized workout routine that is tailored to the user and based on, for example, previous workout information that was provided by the assistant input device 105 when pairing initially took place. In form implementations, a trainer may be watching the user remotely and can provide additional information that can be utilized to generate responses for the user. For example, a trainer can develop a workout plan for the user and the user can be provided the workout plan via the headphones 100, either directly from the trainer and/or from the location automated assistant 118.

In some implementations, determining that a user has been previously present at a location can be determined based on user information that is provided to the location automated assistant 118 when the location automated assistant 118 is paired with the assistant input device 105, either for the first time or on a subsequent visit. For example, when the assistant input device 105 is initially present at the location, a token can be provided as user information that indicates that it is the first time the assistant input device 105 is present. On subsequent visits, a different token can be provided that indicates when the user was last present, how many times the user has been present at the location, and/or other information related to previous visits by the user. In some implementations, one or more components of the location device 115 can identify unique visits of an assistant input device 105, such as by maintaining MAC addresses of paired devices, and determine, when a device pairs, whether it has previously paired with the location device 115.

By determining whether the user has been to a location before (or another location that is partnered with the location, such as a different hotel of the same chain), response data that is provided to the user can be tailored to the user. For example, user information can include information related to a membership status of the user (e.g., a "frequent stayer" membership) and the response data that is provided when the user first enters the hotel can include a welcome message that is tailored to the user and the status of the user (e.g., "I see you are a diamond member. Welcome back. Your room is ready."). Further, in instances where a user is determined to have not been at the hotel or stayed at an affiliated hotel before, the user can be instructed with more detailed instructions regarding the hotel and/or checking in (e.g., "Please visit the reception desk to check in. It is located on your left.").

As yet another example, a museum can include a location 115 that is executing a location automated assistant 118, which a user can pair with when entering the museum, as previously described. In this instance, the trust measure may be lower than in other examples and the museum automated assistant 118 may only receive information related to whether the user has previously visited the museum without any additional personal information. The user can provide requests, such as "What is in this wing?" to be provided with a response that is tailored to the current location of the user within the museum. Further, the user can provide a request, such as "Is there anything in the gift shop about this sculptor?" while standing in the vicinity of an exhibit and be provided with information related to the gift shop of the museum. In some implementations, the location automated assistant 118 can have access to inventory information of the gift shop so that responses are accurate at the time of being provided. For example, the user can request "Is there a book on Monet in the gift shop," the location automated assistant 118 can check the inventory of the gift shop and/or interface with another application that has access to the inventory of the gift shop, and provide the user with a response that is accurate in real time.

As yet another example, a coffee shop can have a location device 115 executing a location automated assistant 118. The user, once paired, can provide a request, via the headphone 100, that includes a coffee order and can then sit at a table and wait for the order to be prepared. In this instance, the location automated assistant 118 may be provided with credit card information of the user but no other additional information, based on the trust measure between the location automated assistant 118 and the user, and with the explicit intent to utilize the credit card information to purchase a coffee.

In some implementations, one or more administrators of the location automated assistant 118 can be provided with an interface that allows the administrator to provide additional information that can be utilized by the location automated assistant 118 when generating responses. For example, an administrator can monitor how many people are currently in line to be checked in at a hotel and only enable automatic check-ins via the location automated assistant 118 when the number of people waiting to check in exceeds a threshold. Also, for example, if there is a line of people waiting to check in, the user can be provided with a response of "We are experiencing longer than usual wait times to check in. Would you like to visit the cafe and have a free cup of coffee while you wait?" instead of directly being provided with directions to the reception desk.

As previously described, the responses that are provided to the user can be tailored based on information related to previous visits of the user to the location. For example, a user may be provided with check-in information the first time they enter a hotel, but after leaving and returning during their stay, the user may be provided with different information when entering the hotel (e.g., dinner specials, entertainment options for the evening). Also, for example, if the user is at a hotel for a convention, the location automated assistant 118 can provide information related to what is currently taking place in the conference, either in response to a request of the user (e.g., "OK Hotel Assistant, what's happening in Ballroom A") or automatically as events occur (e.g. "There is a seminar starting in five minutes that you are signed up for. Please go to Room B").

In some implementations, the location can have multiple location automated assistants 118 executing and the user can select one automated assistant over another automated assistant, based on user preferences and/or based on user intentions while at the location. For example, a hotel may have a location automated assistant that is configured to respond to requests related to the hotel and ordinary hotel guests and a second automated assistant that is configured to respond to requests related to a particular conference that is taking place at the hotel (e.g., non-hotel guest users and/or hotel guests that are attending the conference). Thus, in some implementations, two users that are each located in the same vicinity may receive different responses to the same request, based on which automated assistant executes the requests. For example, for a request of "What is going on today at 3?," one user may be provided with convention information regarding seminars that are taking place at 3 and another user, paired with the hotel automated assistant, may be provided with information related to the spa of the hotel.

Figure 2A:
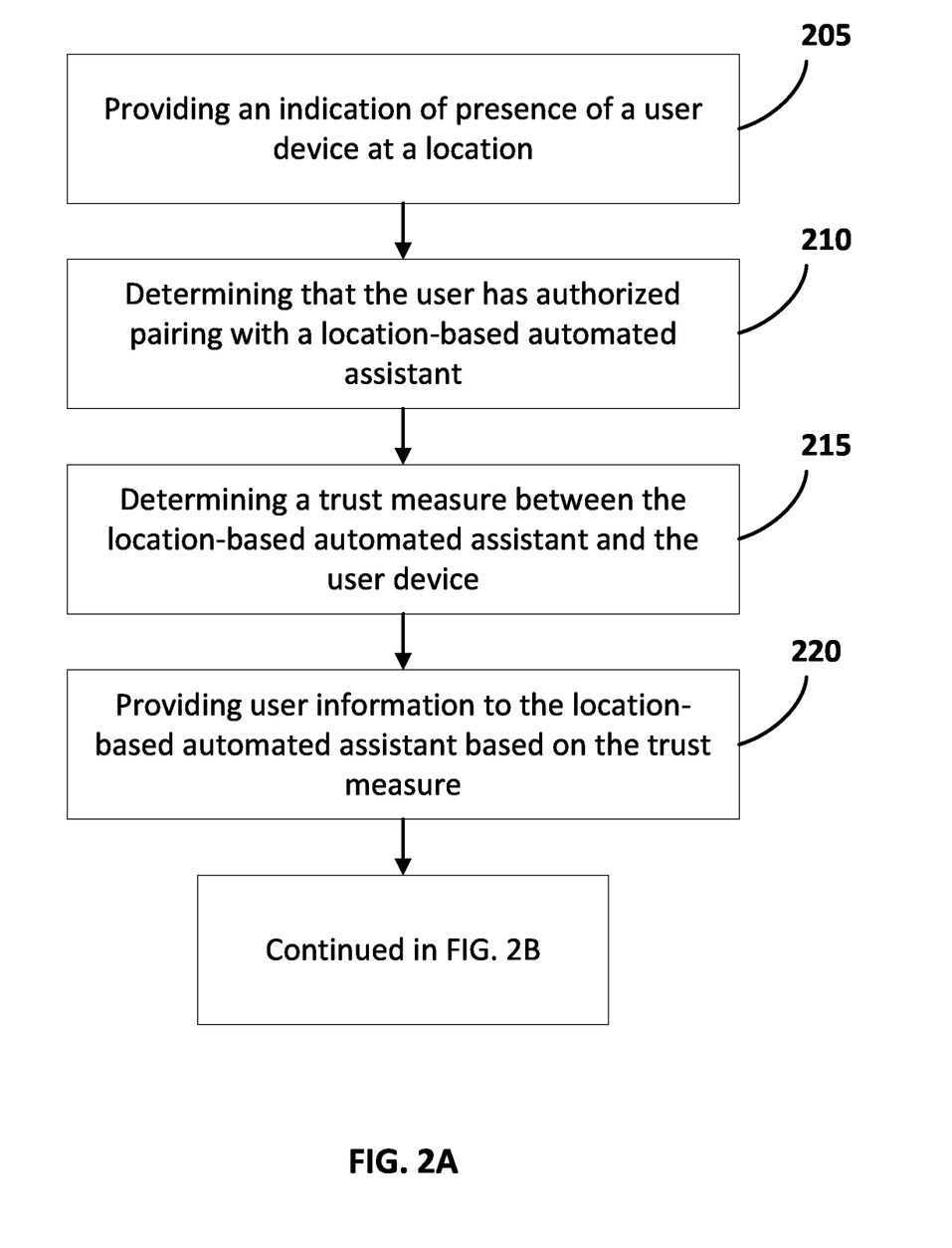
FIG. 2A and FIG. 2B illustrate a flowchart of an example implementation of creating a group automated assistant session.
Figure 2B:
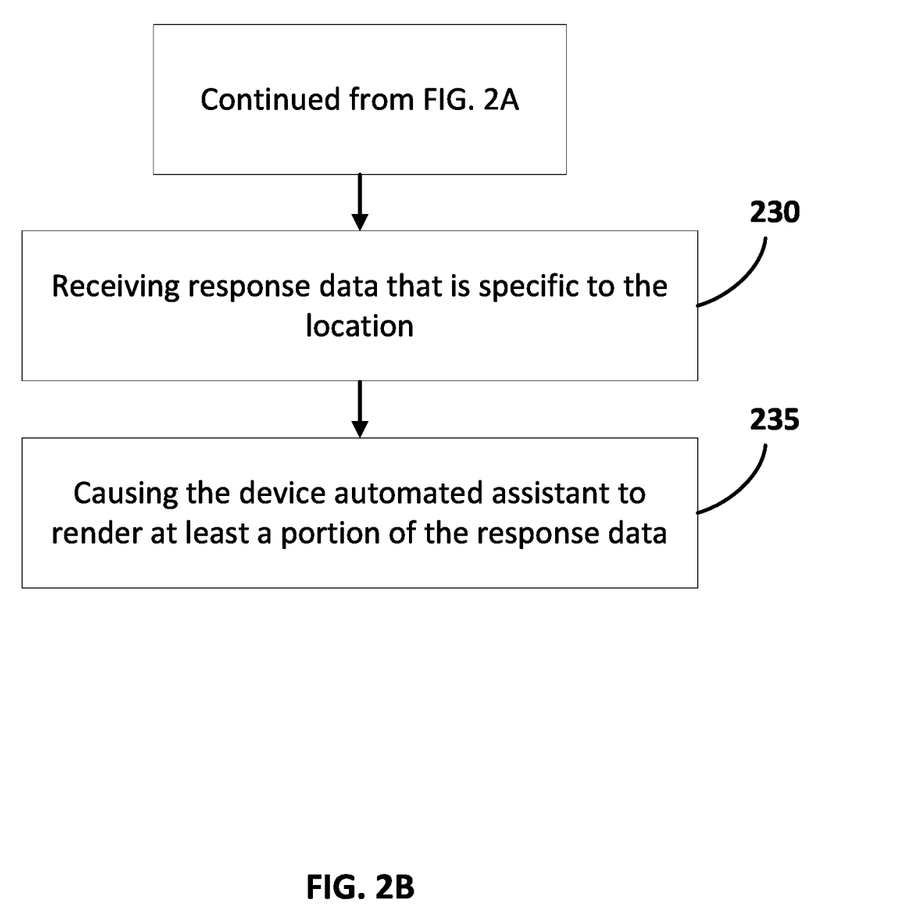

Referring to FIGS. 2A and 2B, a flowchart of an example method for pairing a user device with a location-based automated assistant is illustrated. For convenience, the operations of the method are described with reference to a system that performs the operations. This system can include one or more processors and/or other component(s) of a client device. Moreover, while operations of the method are shown in a particular order, this is not meant to be limiting. One or more operations may be reordered, omitted, or added.

At step 205, an indication of presence of a user device at a location is provided. The indication can be provided via a location detection component of a device that shares one or more characteristics with assistant input device 105. For example, assistant input device 105 can include a GPS component that can determine a geographic location of a user and assistant input device 105 can provide a signal that indicates a current location of the input device 105. Also, for example, assistant input device 105 can connect to one or more local networks (e.g., a Wifi network of a location) and provide an indication that the assistant input device 105 is present at the location that is associated with the network.

At step 210, authorization to pair the user device with a location-based automated assistant is determined. In some implementations, the user can indicate, via one or more settings of an application executing on the assistant input device 105, an intention to connect with one or more location-based automated assistants. In some implementations, the user can specify particular automated assistants with which, when present in locations associated with the one or more automated assistants, to pair with the location-based automated assistant, such as location automated assistant 118, when the device is present at a location. For example, the user can indicate, via one or more settings of the assistant input device 105, to pair with a particular hotel's location automated assistant when the assistant input device 105 is present at one of the hotels of the hotel chain. Also, for example, a user may be prompted to provide authorization when the assistant input device 105 arrives at a location that is associated with a location-based automated assistant. For example, the user may be prompted, via audio and/or a visual interface, that "This hotel has an assistant. Would you like to speak to it?" Upon confirmation, the assistant input device 105 can be paired with the location automated assistant 118.

At step 215, a trust measure between the location-based automated assistant and the user device is determined. The trust measure can be indicated by the user and/or can be based on information related to the location of the location automated assistant 118. For example, a hotel can provide a location automated assistant 118 at one or more locations, and the assistant input device 105, when present at one of the locations, can be provided with security information to indicate that the location automated assistant 118 has been verified by one or more security entities and/or otherwise provide security information that can be utilized by the assistant input device to determine the veracity of the location automated assistant 118. In some implementations, the trust measure can be a level (e.g., high, medium, low, none) and/or can be a numerical measure (e.g., 0 for not trusted to 100 for completely trusted) that indicates how trustworthy the location automated assistant 118 is and therefore what user information should be provided to the location automated assistant 118. In some implementations, the trust measure may be associated with the type of entity that is providing the location automated assistant 118. For example, a hotel automated assistant 118 may have a "hotel" trust measure whereas a museum may have a "museum" trust measure and/or a "public" trust measure. In some implementations, the trust measure can be personalized for the user, such as determining trust measure based on previous interactions of the user with other location automated assistants.

At step 220, user information is provided to the location-based automated assistant by the device automated assistant. The user information that is provided by the assistant input device 105 may be based on the trust measure that was determined at step 215. For example, a hotel may have a trust measure of "high," a numerical value that is above a threshold, and/or a "hotel" trust measure that indicates what information (and/or the type of information) that is provided to the location automated assistant 118. User information can include, for example, reservation information, calendar information, message information (emails and/or text messages), and/or other information that can assist the location automated assistant 118 when generating responses to the user. For example, a hotel location automated assistant 118 may have a trust measure that is more indicative of trust than a museum location automated assistant 118. As a result, the hotel location automated assistant 118 may be provided with reservation information, user name, calendar entries, and/or other information that can assist the location automated assistant 118 in checking in the user at the hotel and/or providing information related to a convention that is hosted by the hotel. Conversely, a cafe location automated assistant 118 may be provided with payment information for the user, but may not be provided with additional information, such as information from calendar entries, as a result of a lower and/or different trust measure.

At step 230, response data is received that is specific to the location. The response data can be generated by the location automated assistant 118 and can be based on at least a portion of the user information that was provided by the assistant input device 105. For example, a user may enter a hotel lobby and, as previously described, the assistant input device 105 can be paired with the location automated assistant 118 of the hotel. Information that is pertinent to checking in the user (e.g., user name, reservation information, calendar entry indicating hotel information) can be provided by the assistant input device 105 and the user information can be utilized to cause the user to be checked into the hotel automatically without additional input from the user. As a result, response data of "Your room number is 1099, please proceed to the elevators on your left" can be generated. At step 235, the device automated assistant renders at least a portion of the response data to the user via one or more speakers.

Figure 3A:
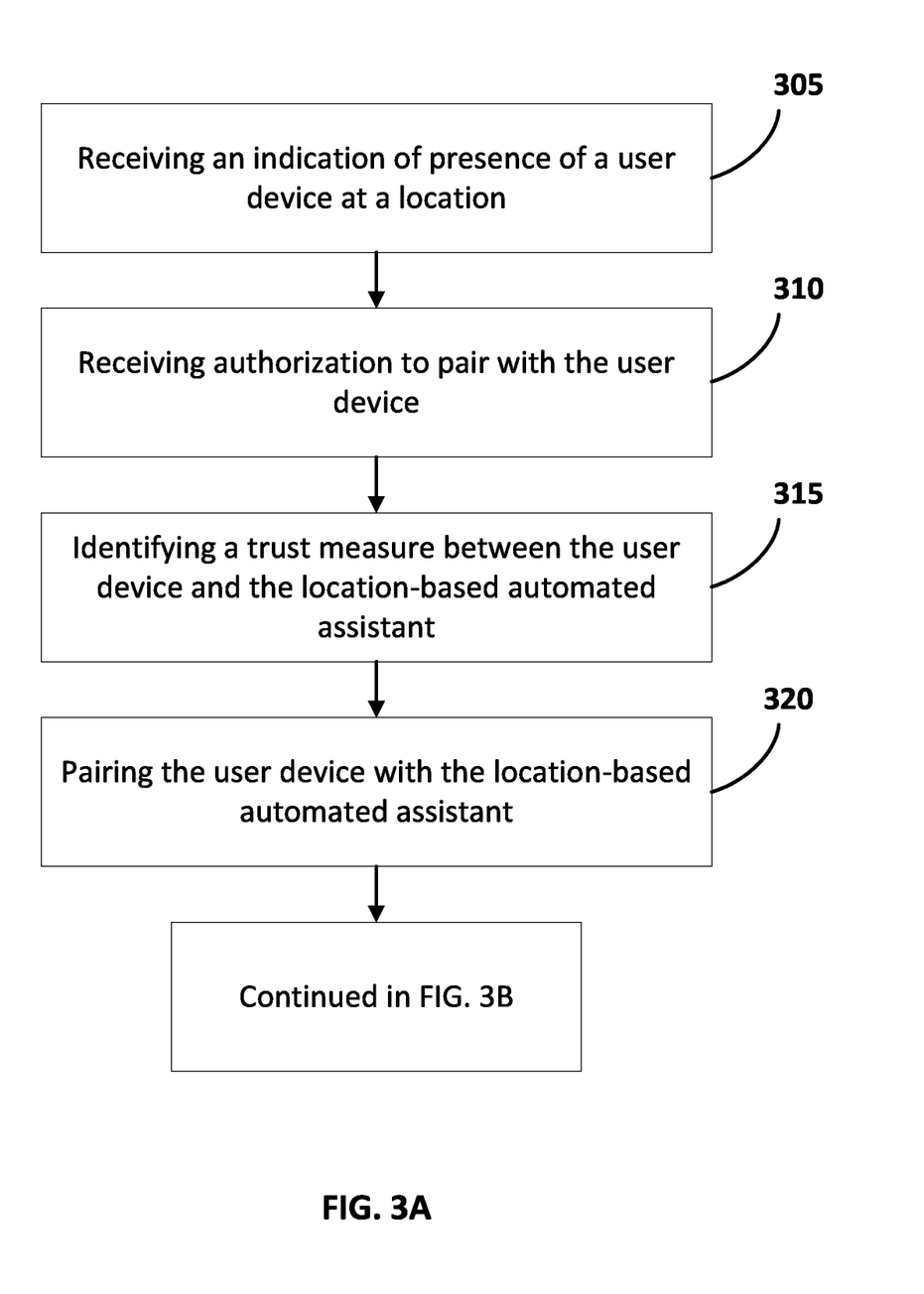
FIG. 3A and FIG. 3B illustrate a flowchart illustrating an example method according to various implementations disclosed herein.
Figure 3B:
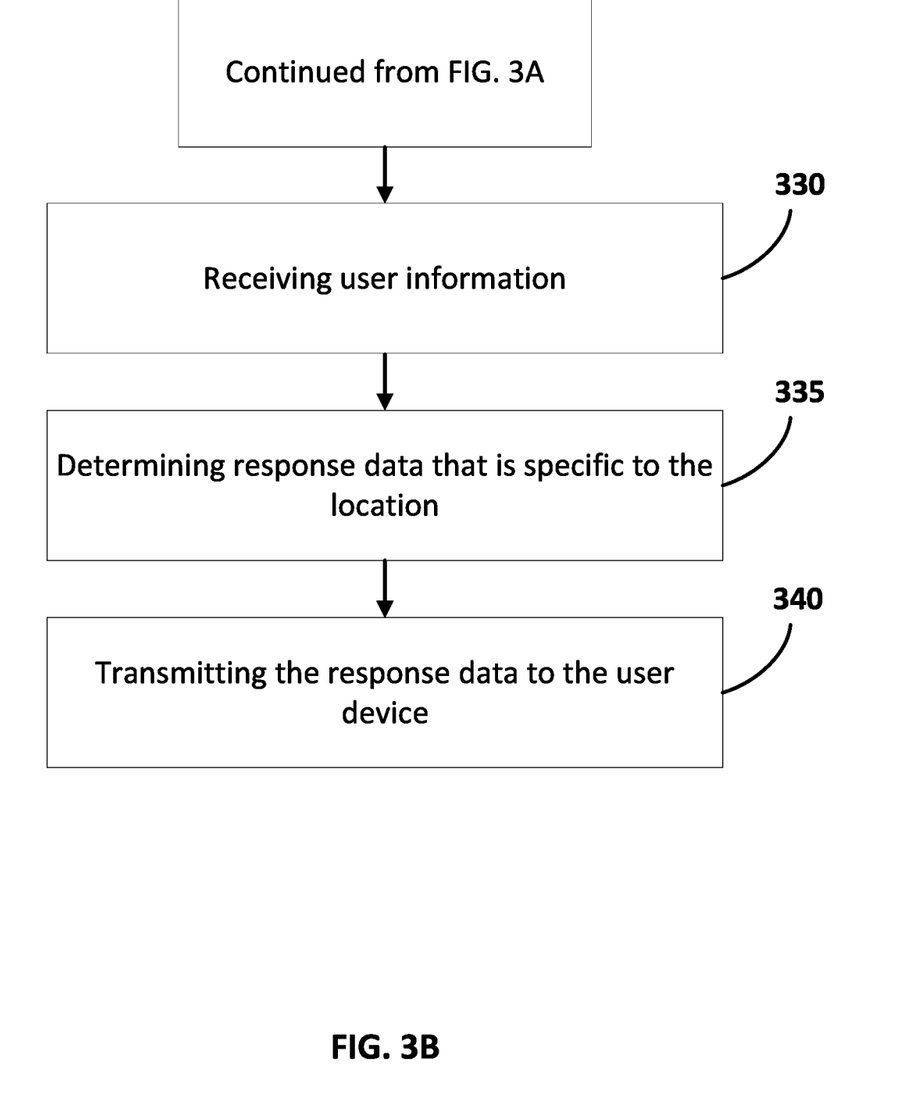

Referring to FIGS. 3A and 3B, a flowchart of another example method for pairing a user device with a location-based automated assistant is illustrated. For convenience, the operations of the method are described with reference to a system that performs the operations. This system can include one or more processors and/or other component(s) of a client device. Moreover, while operations of the method are shown in a particular order, this is not meant to be limiting. One or more operations may be reordered, omitted, or added.

At step 305, an indication is received from a user device that indicates that the user device is present at a location. The indication can be received from a device that shares one or more characteristics with assistant input device 105. In some implementations, step 305 can share one or more characteristics with step 205 of FIG. 2A.

At step 310, authorization to pair a location-based automated assistant with the user device is received. Authorization can share one or more characteristics with step 210 of FIG. 2A. For example, the location device 115 can provide security information to the assistant input device 105, which can verify the security information such that the origin of the location device 115 can be determined.

At step 315, a trust measure is determined that indicates a level of trust between the user device and the location-based automated assistant. The trust measure can share one or more characteristics with step 215 of FIG. 2A. For example, the trust measure can be a level, a description of trustworthiness, and/or a numerical representation of trust between the location automated assistant 118 and the assistant input device 105. At 320, the user device is paired with the location-based automated assistant.

At step 330, user information is received from the user device. The user information can share one or more characteristics with the user information described with regards to step 220 of FIG. 2A. For example, user information can include user name, reservation information, calendar entries, message information and/or other information that is determined based on the trust measure established between the assistant input device 105 and the location automated assistant 118.

At step 335, response data that is specific to the location is determined by the location-based automated assistant. The response data can be determined by a component that shares one or more characteristics with location automated assistant 118. In some implementations, the response data can be determined based, at least in part, on the user information provided to the location automated assistant 118 at step 330.

At step 340, the response data is transmitted to the user device, thereby causing the user device to render at least a portion of the response data via one or more speakers. In some implementations, the user device can include one or more speakers 110. For example, the user device can be a headphones apparatus that includes speakers 110, a microphone, 109, and/or one or more automated assistant components executing on the device and/or in communication with one or more cloud-based assistant components 120. In some implementations, the headphones 100 can be a separate device that is paired with the assistant input device 105, such as earbuds that are paired to a smartphone via one or more communication networks.

Figure 4:
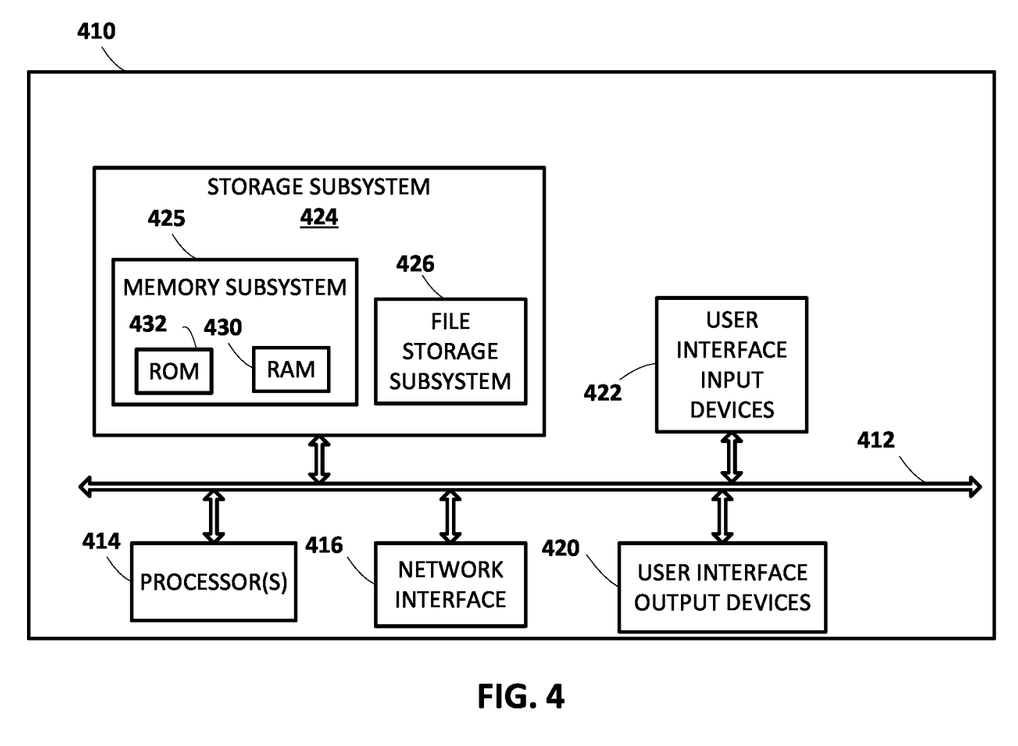
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 5 and FIG. 6, and/or to implement various components depicted in FIG. 2 and FIG. 3.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

Implementations disclosed herein describe a computer implemented method that includes the steps of providing, by a user device of a user, an indication of presence of the user device at a location, wherein the user device is executing a device automated assistant, determining that the user has authorized pairing a location-based automated assistant with the user device, determining a trust measure between the location-based automated assistant and the device automated assistant, and providing, from the device automated assistant and the location-based automated assistant, user information, wherein the user information is selected based on the trust measure. In response to providing the user information, the method further includes the steps of receiving, from the location-based automated assistant, response data that is specific to the location and that is based on the user information, and causing the device automated assistant to render, via one or more speakers associated with the user device, audio data that includes at least a portion of the response data.

These and other implementations of the technology disclosed herein can include one or more of the following features.

In some implementations, the method further includes providing a request of the user, wherein the response data is further determined based on the request of the user, and wherein the audio data is rendered in response to receiving the request.

In some implementations, determining that the user has authorized pairing the location-based automated assistant with the user device includes determining that the user has previously been present at the location.

In some implementations, the response data is further based on interactions between the device automated assistant and the location-based automated assistant when the user was previously present at the location.

In some implementations, determining that the user has authorized pairing the location-based automated assistant with the user device is based on identifying, from one or more other applications executing on the user device, authorization information. In some of those implementations, the application is a calendar application, and the authorization information includes a calendar entry that indicates the location. In other of those implementations, the authorization information includes reservation information related to the location.

In some implementations, the trust measure indicates particular information to provide to the location-based automated assistant as user information, and wherein the user information is selected based on the user information conforming to the particular information indicated by the trust measure.

In some implementations, the user information includes one or more user automated assistant preferences.

In some implementations, the user device is headphones, and wherein the one or more speakers are integrated with headphones.

In some implementations, the user device is a smartphone, and wherein the one or more speakers are integrated with headphones that are paired to the user device.

In another aspect, other implementations described herein disclose a computer implemented method that includes the steps of receiving, from a user device that is executing a device automated assistant, an indication that the user device is present at a location that is associated with a location-based automated assistant, receiving, from the user device, authorization to pair the location-based automated assistant with the user device, identifying a trust measure between the location-based automated assistant and the device automated assistant, and pairing the user device with the location-based automated assistant, wherein, once paired, user requests provided by the user device are processed by the location-based automated assistant. In response to pairing the user device with the location-based automated assistant, the method further includes receiving, from the device automated assistant, user information, wherein the user information is selected by the device automated assistant based on the trust measure, determining, by the location-based automated assistant and based on the user information, response data that is specific to the location, and transmitting the response data to the user device, wherein the response data causes the device automated assistant to render, via one or more headphones paired with the user device, audio data that includes at least a portion of the response data.

These and other implementations of the technology disclosed herein can include one or more of the following features.

In some implementations, the method further includes receiving, by the location-based automated assistant and from the user device, a request of the user, wherein the response data is further determined based on the request of the user, and wherein the audio data is rendered in response to receiving the request.

In some implementations, determining that the user has authorized pairing the location-based automated assistant with the user device includes determining that the user has previously been present at the location.

In some implementations, the response is based on interactions with the location-based automated assistant when the user was previously present at the location.

In some implementations, determining that the user has authorized pairing the location-based automated assistant with the user device is based on identifying, from one or more other applications executing on the user device, authorization information.

Other implementations can include a transistor or non-transitory computer readable storage medium storing instructions executable by a processor to perform a method such as one or more of the methods described above. Yet another implementation can include a control system including memory and one or more processors operable to execute instructions, stored in the memory, to implement one or more modules or engines that, alone or collectively, perform a method such as one or more of the methods described above.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A computer implemented method, the method comprising:
   providing, by a user device of a user, an indication of presence of the user device at a location, wherein the user device is executing a device automated assistant;
   determining that the user has authorized pairing a location-based automated assistant with the user device;
   determining, based on one or more features of the location-based automated assistant and from among three or more trust measures, a particular trust measure between the location-based automated assistant and the device automated assistant;
   selecting, based on the particular trust measure and from a plurality of instances of user information, a particular set of user information, wherein selecting the particular set of user information comprises:
      selecting, as the particular set of user information, a first set of the instances of the user information when the particular trust measure is a first of the three or more trust measures,
      selecting, as the particular set of user information, a second set of the instances of the user information when the particular trust measure is a second of the three or more trust measures, and
      selecting, as the particular set of user information, a third set of the instances of the user information when the particular trust measure is a third of the three or more trust measures;
   providing, from the device automated assistant and to the location-based automated assistant, the particular set of user information selected based on the particular trust measure; and in response to providing the user information:
receiving, from the location-based automated assistant, response data that is specific to the location and that is based on the user information; and
causing the device automated assistant to render, via one or more speakers associated with the user device, audio data that includes at least a portion of the response data.

2. The method of claim 1, further comprising:
providing a request of the user, wherein the response data is further determined based on the request of the user, and wherein the audio data is rendered in response to receiving the request.

3. The method of claim 1, wherein determining that the user has authorized pairing the location-based automated assistant with the user device includes determining that the user has previously been present at the location.

4. The method of claim 1, wherein the response data is further based on interactions between the device automated assistant and the location-based automated assistant when the user was previously present at the location.

5. The method of claim 1, wherein determining that the user has authorized pairing the location-based automated assistant with the user device is based on identifying, from one or more other applications executing on the user device, authorization information.

6. The method of claim 5, wherein the application is a calendar application, and wherein the authorization information includes a calendar entry that indicates the location.

7. The method of claim 5, wherein the authorization information includes reservation information related to the location.

8. The method of claim 1, wherein the particular trust measure indicates particular information to provide to the location-based automated assistant as user information, and wherein the user information is selected based on the user information conforming to the particular information indicated by the trust measure.

9. The method of claim 1, wherein the user information includes one or more user automated assistant preferences.

10. The method of claim 1, wherein the user device is headphones, and wherein the one or more speakers are integrated with headphones.

11. The method of claim 1, wherein the user device is a smartphone, and wherein the one or more speakers are integrated with headphones that are paired to the user device.

12. A computer implemented method, the method comprising:
receiving, from a user device that is executing a device automated assistant, an indication that the user device is present at a location that is associated with a location-based automated assistant;
receiving, from the user device, authorization to pair the location-based automated assistant with the user device;
identifying a trust measure between the location-based automated assistant and the device automated assistant;
pairing the user device with the location-based automated assistant, wherein, once paired, user requests provided by the user device are processed by the location-based automated assistant;
in response to pairing the user device with the location-based automated assistant:
receiving, from the device automated assistant, user information, wherein the user information is selected by the device automated assistant based on the trust measure;
determining, by the location-based automated assistant and based on the user information, particular response data that is specific to the location, wherein determining the particular response data comprises:
selecting, when the user information is a first set of information selected responsive to the trust measure being a first trust measure, a first set of response data as the particular response data;
selecting, when the user information is a second set of information selected responsive to the trust measure being a second trust measure, a second set of response data as the particular response data; and
selecting, when the user information is a third set of information selected responsive to the trust measure being a first trust measure, a third set of response data as the particular response data; and
transmitting the particular response data to the user device, wherein the response data causes the device automated assistant to render, via one or more headphones paired with the user device, audio data that includes at least a portion of the response data.

13. The method of claim 12, further comprising:
receiving, by the location-based automated assistant and from the user device, a request of the user, wherein the particular response data is further determined based on the request of the user, and wherein the audio data is rendered in response to receiving the request.

14. The method of claim 12, wherein determining that the user has authorized pairing the location-based automated assistant with the user device includes determining that the user has previously been present at the location.

15. The method of claim 12, wherein the response is based on interactions with the location-based automated assistant when the user was previously present at the location.

16. The method of claim 12, wherein determining that the user has authorized pairing the location-based automated assistant with the user device is based on identifying, from one or more other applications executing on the user device, authorization information.

17. A system, comprising:
a location device, wherein the location device is executing a location-based automated assistant that is associated with a location; and
a user device, wherein the user device is executing a device automated assistant, and wherein the user device is present at the location, wherein the user device is configured to:
provide, to the location device, an indication of presence of the user device of a user at the location;
determine, based on one or more features of the location-based automated assistant and from among three or more trust measures, a particular trust measure between the user device and the location device; and
select, based on the particular trust measure and from a plurality of instances of user information, a particular set of user information, wherein in selecting the particular set of user information, the user device is configured to:

select, as the particular set of user information, a first set of the instances of the user information when the particular trust measure is a first of the three or more trust measures, select, as the particular set of user information, a second set of the instances of the user information when the particular trust measure is a second of the three or more trust measures, and select, as the particular set of user information, a third set of the instances of the user information when the particular trust measure is a third of the three or more trust measures;

provide the particular set of user information, selected based on the particular trust measure, to the location-based automated assistant, and wherein the location-based automated assistant is configured to:

determine, based at least in part on the user information, response data that is specific to the location; and provide the response data to the device automated assistant, wherein providing the responses data causes the device automated assistant to render, via one or more headphones paired with the user device, audio data that includes at least a portion of the response data.

18. The system of claim 17, wherein the location-based automated assistant is further configured to:

receive a request of the user from the device automated assistant, wherein the response data is further determined based on the request of the user, and wherein the audio data is rendered in response to receiving the request.

19. The system of claim 17, wherein determining that the user has authorized pairing the location-based automated assistant with the user device includes determining that the user has previously been present at the location.

20. The system of claim 17, wherein the response is based on interactions with the location-based automated assistant when the user was previously present at the location.

* * * * *